A. N. GOLDSMITH AND J. WEINBERGER.
RADIO RECEIVING SYSTEM.
APPLICATION FILED SEPT. 13, 1918.

1,396,571.

Patented Nov. 8, 1921.

Inventor:
Alfred N. Goldsmith,
Julius Weinberger,
Their Attorney.

UNITED STATES PATENT OFFICE.

ALFRED N. GOLDSMITH AND JULIUS WEINBERGER, OF NEW YORK, N. Y., ASSIGNORS TO GENERAL ELECTRIC COMPANY, A CORPORATION OF NEW YORK.

RADIO RECEIVING SYSTEM.

1,396,571.  Specification of Letters Patent.  Patented Nov. 8, 1921.

Application filed September 13, 1918. Serial No. 253,938.

*To all whom it may concern:*

Be it known that we, ALFRED N. GOLDSMITH and JULIUS WEINBERGER, citizens of the United States, residing at New York, county of New York, State of New York, have invented certain new and useful Improvements in Radio Receiving Systems, of which the following is a specification.

Our present invention relates to radio signaling systems and particularly to a receiving system which is adapted for use in a duplex system.

The object of our invention is to provide a receiving system which is adapted to be used in close proximity to a transmitting system and which is capable of receiving signals from a distant station at the same time that signals are being sent from the transmitting station.

In duplex radio telegraphy or telephony, the object sought is the simultaneous reception and transmission of messages. In most cases it has heretofore been customary to accomplish the object by having two separate stations; a transmitting station and a receiving station separated by many miles and usually connected by wire lines. This procedure has been necessary in order to prevent the transmitted signals from interfering with the reception of the desired signals.

This interference is due to both the electric and magnetic fields of the local transmitting antenna. If a receiving system of any kind is installed very near to the transmitting antenna the interference is largely electrostatic in nature. That is, the capacitive exposure of the receiving system to the transmitting antenna causes charges to be induced therein which give rise to the interference in question. In carrying out our invention the effect of this capacitive induction is eliminated by the use of an electrostatically balanced closed loop or coil receiver.

Figure 1:
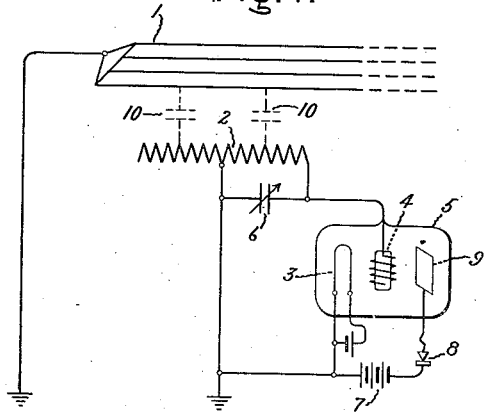
Figure 2:
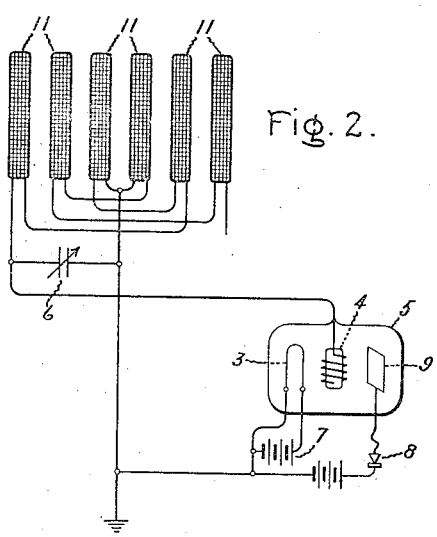
Figure 3:
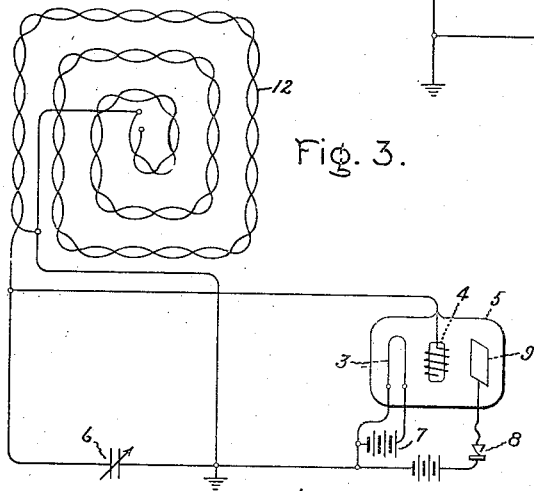
Figure 4:
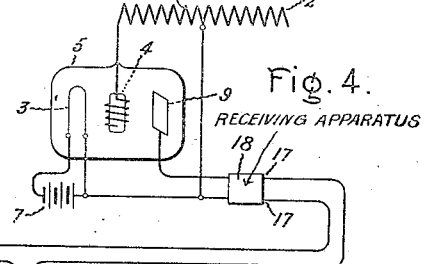
Figure 5:
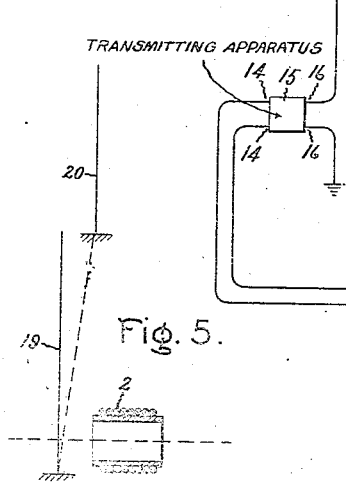

The novel features which we believe to be characteristic of our invention are set forth with particularity in the appended claims. The invention itself, however, both as to its organization and method of operation will best be understood by reference to the following description taken in connection with the accompanying drawing in which Figure 1 shows diagrammatically one way in which our invention may be carried into effect; Figs. 2 and 3 show different types of receiving coils which may be used; Fig. 4 shows diagrammatically a circuit arrangement which may be employed in connecting the duplex system to a wire line; and Fig. 5 shows an arrangement which may be used for overcoming the effect of electromagnetic induction as well as electrostatic.

In the arrangement shown in Fig. 1, the transmitting antenna is indicated by 1, and 2 is the coil employed for reception. This coil is connected to the cathode 3 and grid 4 of an electron discharge amplifier 5. A tuning condenser 6 may be used for tuning the receiving circuit to the frequency of the signals to be received. The plate circuit of the amplifier 5 comprises the cathode 3 of the amplifier, a local source of current 7, a wave responsive device 8 and the anode 9 of the amplifier. The grid 4 is connected to one end of the coil 2 and the cathode 3 is connected to the junction point of the two halves of the coil. This point is connected to earth.

The mode of operation of this system may be explained as follows. The exposure of the two halves of coil 2 may be represented by the condensers 10 shown in dotted lines. It will be apparent that, for currents flowing through these condensers and the two halves of coil 2 to ground, the magnetic fields of the two halves are in opposition and the two halves of coil 2 act as inductances in parallel. The inductance of the coil for such currents then is $\frac{L-M}{2}$ where L is the inductance of each half of the coil and M is the mutual inductance between the two halves. If M is made equal or very nearly equal to L then the coil becomes a non-inductive path to ground for capacitively induced currents; consequently no potential difference can build up across its terminals and no interference will result in the receiving set from the local antenna.

While the capacitive induction from the local antenna will be balanced in this manner, a totally different behavior occurs toward the signals to be received. In the case of the local antenna we deal with a stationary electric field, inasmuch as radiation commences only outside of the quarter wave length zone; in the case of the distant antenna, a traveling electromagnetic wave cuts across the coil. The receiving circuit then has induced in it an electromotive force which is equal to the resultant of the electromotive forces induced in the various portions of the coil. In each element of the coil there will be produced an electromotive force which varies in amplitude and phase from that induced in every other element. Some of these electromotive forces will partially neutralize each other but the resultant electromotive force will cause a current to flow in the receiving circuit. In practice it is found that the neutralization will be minimized by making the coil of large dimensions in the direction of the wave and that the larger the dimensions of the coil both in a horizontal and vertical direction the stronger the signals will be.

It is apparent from the above explanation that the induction from the local transmitting antenna, that is induction due to a stationary electric field will be balanced out but the induction from the distant antenna due to the traveling electromagnetic waves will not.

In Fig. 2 we have shown an efficient way of obtaining a perfect equalization of the exposure of the two halves of the coil. In this case a plurality of unit coils 11 are employed, each of the type known as "pancakes" or "spirals." These are multi-layer solenoids with one or only a few turns parallel to the axis of the solenoid. The coils are connected in series in the manner shown, by which a thorough capacitive transposition is obtained. That is the unit coils are so connected that their magnetic fields add but successive coils are transposed to either side of the neutral or grounded point in order to effectively equalize or balance the capacitive exposure of the two halves of the combination.

Another method of carrying out our invention is to make the receiving coil of a pair of wires 12 twisted together as indicated in Fig. 3, and use only one of these wires for reception. It is apparent that the transposition of the two halves of the winding will be brought about in this way even more effectively than by the form shown in Fig. 2.

In Fig. 4 we have indicated diagrammatically the manner in which the receiving and transmitting apparatus may be connected to a wire line to connect a subscriber's telephone, for example, to the duplex system. The incoming line is represented by the conductors 13 which are connected to the input terminals 14 of the transmitting apparatus 15, the output terminals 16 of which are connected to the antenna 1. The conductors 13 are also connected to the output terminals 17 of the receiving apparatus 18 which is controlled by the receiving coil 2 and the amplifier 5.

While the effect of electrostatic induction will in most cases be much more troublesome than that due to the magnetic field from the feed wires of the antenna, if the latter is strong enough to cause trouble, the receiving coil may be placed in such a position relative to the feed wire that the magnetic induction due to the local antenna is a minimum while that due to the distant station is a maximum. This result may be attained by locating the receiving coil in such a way that its axis points toward the feed wire of the local station and in a direction at right angles to the direction of the distant station. This manner of locating the receiving coil is indicated in Fig. 5 in which 19 indicates the feed wire of the local antenna, 2 the receiving coil and 20 the distant transmitting antenna.

While we have shown and described only a few examples of the manner in which our invention may be carried into effect, we do not wish to be limited to the particular arrangements shown as it will be apparent that many modifications in the manner in which our invention is applied may be made without departing from the scope of the appended claims.

What we claim as new and desire to secure by Letters Patent of the United States, is:

1. A radio receiving system comprising a receiving loop antenna having two halves with large mutual inductance between the halves and a ground connection to the junction point of the two halves so as to provide a substantially non-inductive path to ground for currents induced in the loop by capacitive induction.

2. A radio receiving system comprising a receiving loop antenna having two halves with large mutual inductance between the halves, a ground connection to the junction point of the two halves and receiving apparatus connected to one of the halves only.

3. The combination in a duplex radio signaling system of a transmitting antenna and a receiving coil located in close proximity thereto, said coil comprising two halves with large mutual inductance between the halves and a ground connection to the junction point of the two halves.

4. The combination in a duplex radio signaling system of a transmitting antenna, a receiving coil located in close proximity thereto, said coil comprising two halves with large mutual inductance between the halves, a ground connection to the junction point of the two halves and receiving apparatus connected to one of the halves only.

5. The combination in a duplex radio signaling system of a transmitting antenna, and a receiving coil located in close proximity thereto, said receiving coil comprising two portions with large mutual inductance between the portions, said portions having substantially equal capacitive exposure to the transmitting antenna and a ground connection to the junction point of the two portions.

6. The combination in a duplex radio signaling system of a transmitting antenna, a receiving coil located in close proximity thereto and having its axis extending toward the feed wire of said antenna and in a direction substantially at right angles to that from which signals are to be received, said coil comprising two portions having substantially equal capacitive exposure to the transmitting antenna and a ground connection to the junction point of the two portions.

7. A receiving antenna consisting of a coil having a plurality of turns divided into two substantially equal groups connected in series with each other and forming part of an open circuit, and a ground connection to the junction point of the two groups.

8. A receiving antenna consisting of a coil having a plurality of turns divided into two substantially equal groups connected in series with each other and a ground connection to the junction point of the two groups, the mutual induction between the two groups being large so that a substantially non-inductive path to ground is provided for currents induced in the coil by capacitive induction.

9. A receiving antenna consisting of a coil having a plurality of turns divided into two substantially equal groups, the mutual inductance between said groups being substantially equal to the self induction of each group, and a ground connection to the junction point of the two groups.

In witness whereof, we have hereunto set our hands this 10th day of September, 1918.

ALFRED N. GOLDSMITH.
JULIUS WEINBERGER.